Dec. 10, 1940.  O. C. GIBBS  2,224,783
TELESCOPE SIGHT
Filed July 21, 1938  2 Sheets-Sheet 1
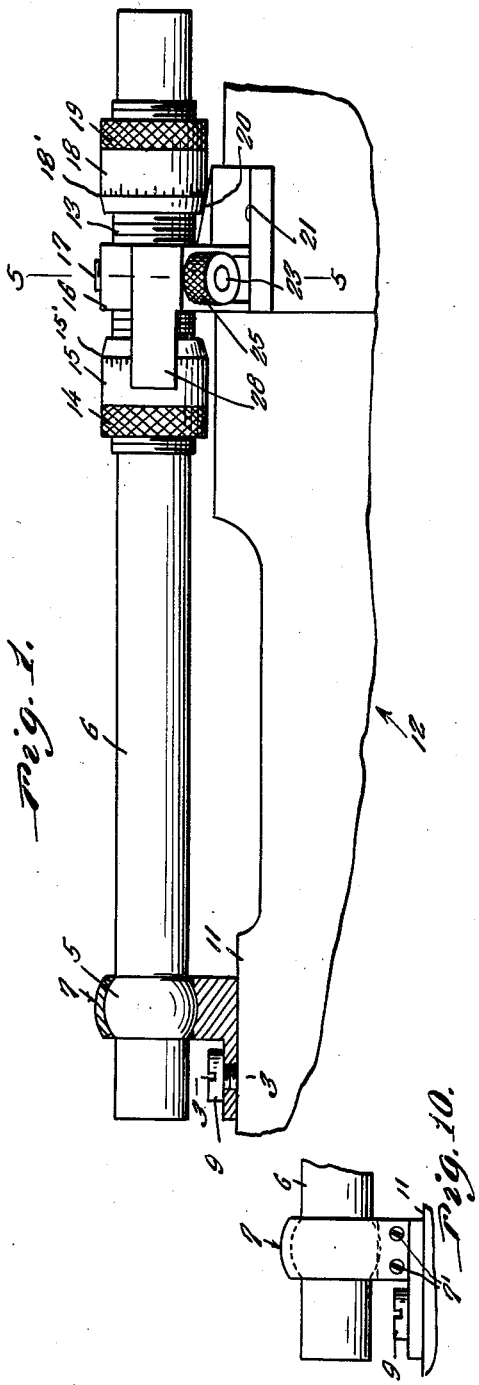
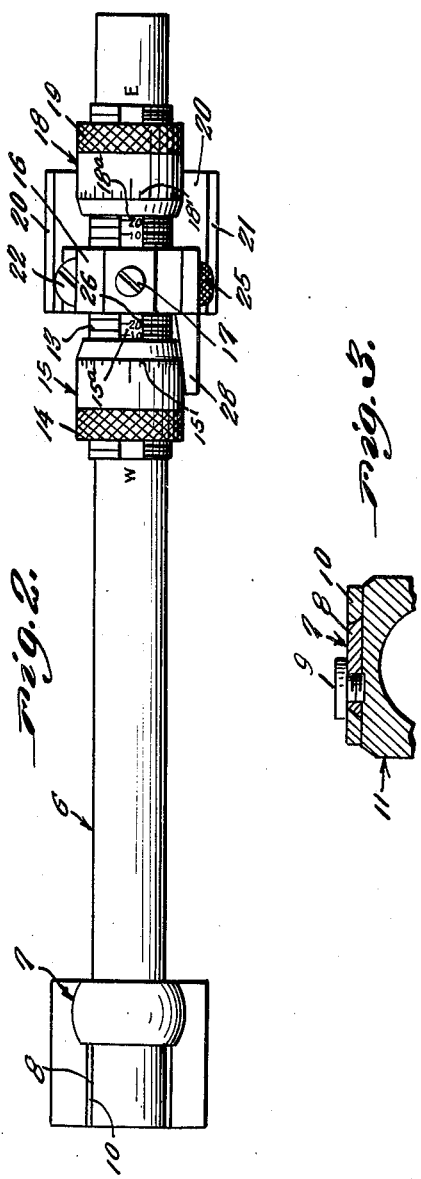
Inventor
O. C. Gibbs
By Clarence A. O'Brien and
Hyman Berman
Attorney

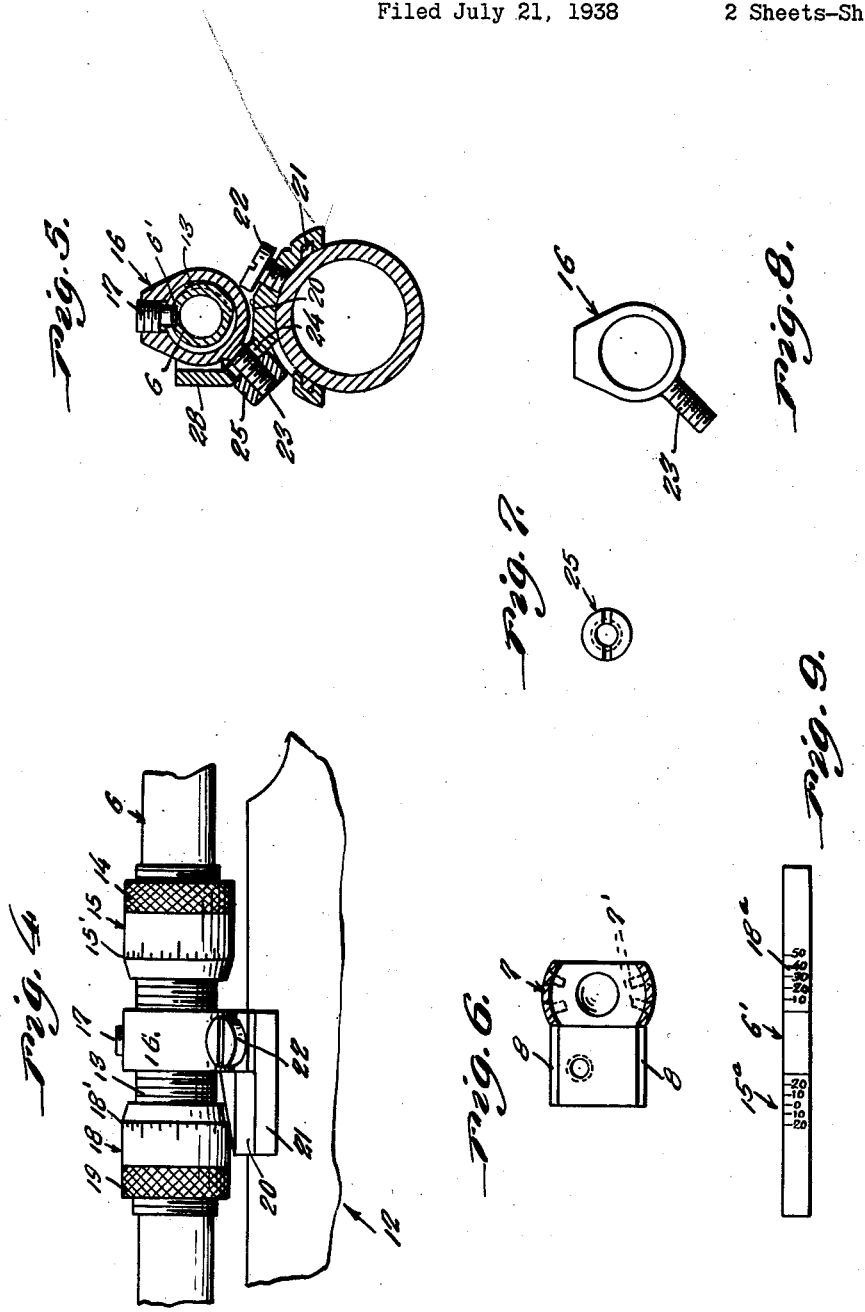

Patented Dec. 10, 1940

2,224,783

UNITED STATES PATENT OFFICE 2,224,783

TELESCOPE SIGHT

Oscar Cleveland Gibbs, Lakeview, Oreg.

Application July 21, 1938, Serial No. 220,552

9 Claims. (Cl. 33—50)

My invention relates generally to telescope sights for firearms, and particularly to a telescope sight especially adapted for use with rifles, and an important object of my invention is to provide an arrangement of the character indicated which provides among others the following advantages:

(1) Provides a more convenient, easy, definite and positive means of securing any desired change in sight adjustment, and in the point of impact of bullets discharged from rifles to which they are attached, than any other telescope sight mounts now in existence;

(2) Make possible a scope or field of adjustment for windage and elevation upon telescope sighted rifles sufficient for all distances over which hunting, target and military rifles are used;

(3) Make possible the use of smaller, shorter, more compact, and appreciably lighter telescope sighting equipment upon such rifles than heretofore;

(4) Places the line of aim through the telescope sight closer to the center of the bore of the rifle than is possible by the use of other mounts now in existence which provide adjustment for changes in the point of impact of bullets discharged therefrom; and (5) Upon removal of the mounts and telescope from the rifle, when resorting to the use of conventional iron sights, leaves the line of aim through the iron sights entirely free and clear of any obstruction, and, moreover, leaves no objectionable projections upon the rifle when the mounts and telescope are removed.

These and other important objects and advantages of my invention will be apparent from a reading of the following description taken in connection with the drawings, wherein for purposes of illustration I have set forth a preferred embodiment of my invention.

In the drawings:

Figure 1 is a general right hand side elevational view of an arrangement in accordance with the present invention partly in longitudinal section.

Figure 2 is a top plan view of Figure 1.

Figure 3 is a transverse vertical sectional view taken through Figure 1 approximately on the line 3—3.

Figure 4 is a side elevational view of the adjusting mount taken from the opposite side of Figure 1.

Figure 5 is a transverse vertical sectional view taken through Figure 1 approximately on the line 5—5.

Figure 6 is a horizontal sectional view taken through the holding mount.

Figure 7 is a top plan view of the lock collar nut.

Figure 8 is an end elevational view of the lock collar.

Figure 9 is a top plan view of the windage and elevation scales on the telescope barrel.

Figure 10 is a fragmentary side elevational view of the holding mount.

In the description of the drawings herein the mounts are not described as the "front mount and rear mount" because on different makes, models, and types of action of rifles a different location of the mounts upon the telescope and upon the rifle is necessary for perfect adaptation. In fact, the "holding mount" and the "adjusting mount" may in certain instances be reversed in position from those shown in the drawings. The design and arrangement shown in the drawings is for a telescope to be attached to a model 54 Winchester rifle, to be mounted forward of the bolt. These mounts comprise a holding mount located near one end of the telescope tube and an adjusting mount located near the opposite end of the telescope tube, the telescope being bridged over the top of the receiver of the rifle. In the arrangement shown in the drawings the holding mount is located near the ocular end of the telescope with the adjusting mount near the objective end thereof.

The mounts described herein are to be attached to rifles by electrically welding or brazing strips of metal on each side of the barrel and upon the rear of the receiver and then machining these to form dovetails to fit and hold the dovetails on the mounts and also by machining such dovetails upon the barrels and receivers of rifles during the course of their manufacture. In this connection I call attention to the forms of dovetails provided for the holding mount. A true male dovetail is on the base of the "holding mount" to fit into the female dovetail formed by welding and machining metal strips on the receiver bridge. A modified form of dovetail formed upon the rifle barrel and adjusting mount is provided to hold the adjusting mount in place. While these mounts may be applied to telescopes already constructed, a lighter, neater, more compact and usable unit and one giving more satisfactory results will be obtained by constructing the same upon the telescope barrel or tube during the course of manufacture and thereafter building the telescope into the tube around which the parts of the mounts have been constructed.

The holding mount

The holding mount consists of a spherical universal joint 5 machined upon the telescope barrel or tube 6 held in a base provided with a male dovetail 8 and a lock screw 9, for locking it in the female dovetail 10, upon the receiver bridge 11 of the rifle 12 by a U-strap 7 and four screws 7' turned through it into the base.

The adjusting mount

The adjusting mount consists of screw threads 13 machined upon the telescope tube 6, a lock nut 14 and windage sleeve 15, a lock collar 16 and set screw 17, and an elevation sleeve 18 and lock nut 19, all threaded to fit the threads 13 on the telescope tube 6 and assembled thereon in the order stated, and a base machined from metal, provided with a female dovetail 21 and a lock screw 22 for locking it to the firearm. Upon this base are machined a vertical ramp 28 and a horizontal ramp 20, and through the arm supporting the vertical ramp an elongated slot 24 is milled. When the base has been secured to the firearm the bolt 23 on the lock collar 16 is passed through the slot 24 and the nut 25 turned up securely on the bolt 23 thereby locking the base and the adjusting mechanism securely together.

A slot 26 is cut through the threads 13 on the top of the telescope tube 6 and in this slot are placed the windage scale 15a for the windage sleeve 15 and the scale 18a for the elevation scale 18. The scale 15a is graduated by tens both ways from zero placed in the center of the scale to provide twenty-five minutes of adjustment for right windage and twenty-five minutes of left windage. The scale 18a is graduated from 10 to 50 by tens, the elevation sleeve being at zero when turned against the lock collar 16. The lock collar 16 occupies the space 6' between the scales 15a and 18a.

Peripheral scales graduated to minutes, half minute, and one-tenth minute of angle are made around the windage sleeve 15 and the elevation sleeve 18 next to the beveled portions thereof, as indicated by the respective numerals 15' and 18'.

By adjusting the parts with reference to the described scales on the telescope tube and on the windage and elevation sleeves the rifleman is enabled to move the point of impact of bullets discharged from his rifle to any desired position on his target.

The degree of slope on the vertical ramp 28 and horizontal ramp 20 and the size of the threads on the telescope tube 6 determine the amount of movement to the right or left or up and down obtained by revolving the windage and elevation sleeves around the telescope barrel and against these ramps. The greater the degree of the ramps and the larger the threads 13 on the telescope tube the greater the movement will be. The ends of the windage and elevation sleeves which bear upon the ramps are sloped to the same degree as the ramps on which they work in order to provide a greater contact or bearing surface between the sleeves and the ramps. The degree of slope to be given these ramps depends upon the distance between the centers of the holding and adjusting mounts, the size of threads on the telescope tube and the number of minutes of angle for elevation and windage desired upon the completed instrument. This is determined as follows: The distance between the centers of the mounts is divided into 3600 inches giving the number of sight base lengths in 100 yards. The figure obtained is divided into one (1) inch which gives the amount of movement required to change the point of impact of the bullet one inch or one minute of angle at one hundred yards range. This last figure is multiplied by the number of minutes of angle for elevation and windage desired upon the completed instrument and the answer indicates the slope the ramps must have.

Operation

The holding mount holds one end of the telescope tube securely to the firearm while permitting the opposite end of the telescope tube to be moved in horizontal and vertical planes, a fraction of an inch which equals the amount of slope of the horizontal ramp 20 and vertical ramp 28.

The lock nuts 14 and 19 lock the windage sleeve 15 and elevation sleeve 18, respectively, in any desired adjusted positions.

The windage sleeve 15 bears upon the vertical ramp 28 and when revolved cams the telescope to the right or to the left in a horizontal plane according to the direction of rotation of the sleeve, thereby providing the windage adjustment. The scale 15a in the slot 26 and the scale 15' on the windage sleeve 15 enable the user to provide for the desired amount of left or right windage.

The elevation sleeve 18 bears on the horizontal ramp 20 and when rotated cams the telescope tube up or down in a vertical plane according to the direction of rotation thereby affording the desired elevation adjustment. The scale 18a in the slot 26 of the telescope tube and the scale 18' on the elevation sleeve 18 calibrate the elevation adjustment. The lock collar 16, the bolt 23, and the nut 25 lock the adjusting sleeves against the related ramps in their adjusted positions. The nut 25 must be released before adjustments are made with either of the sleeves.

The set screw 17 in the lock collar 16 is turned into the slot 26 to prevent the telescope tube 6 from turning in the holding and adjusting mounts.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

Having described the invention, what is claimed as new is:

1. A telescope sight for a rifle, said rifle having spaced dovetail bases thereon, a holding mount dovetailed with one base, an adjusting mount dovetailed with the remaining base, a telescope tube having a spherical part conformably contained by a part of the said holding mount whereby said telescope tube is swingable in vertical and horizontal planes relative to said one base, said tube having an external thread adjacent said adjusting mount, a windage sleeve and lock nut threaded on said thread, a lock collar threaded on said thread and having a set screw engageable with said thread, an elevation sleeve and lock nut threaded on said thread, said lock collar being located between said windage sleeve and said elevation sleeve, and respective horizontal and vertical ramps, said sleeves having beveled parts to bear on the ramps to cam the telescope tube into windage and elevation adjustments, said telescope tube having spaced longitudinally disposed windage and elevation scales adjacent the windage and elevation sleeves, respectively, and peripheral scales on one end of the respective sleeves and related to the windage and elevation scales.

2. A telescope sight comprising a holding mount, an adjusting mount, both mounts being arranged for connection to longitudinal spaced points on a firearm, a telescope tube having a substantially spherical part turning in a conforming part of said holding mount whereby the telescope tube is secured to the holding mount for swinging in vertical and horizontal planes, a screw thread on said telescope tube, said adjusting mount comprising a collar threaded on said screw thread, a set screw on said collar for engagement with said screw thread to lock said collar in adjusted position on said screw thread, said adjusting mount further comprising a relatively stationary part adapted for mounting on the firearm and means adjustably connected between said relatively stationary part and said collar for locking the telescope tube in a selected position.

3. A telescope sight comprising a holding mount, a telescope tube having a spherical part confined by a conformably shaped portion of said holding mount whereby said telescope tube is secured to said mount to swing in vertical and horizontal planes relative to said mount, a screw thread formed on the exterior of said telescope tube, a windage sleeve and a windage sleeve lock nut threaded on said screw thread, an adjusting mount comprising a lock collar threaded on said screw thread at one side of said windage sleeve, an elevation sleeve and an elevation sleeve lock nut threaded on said screw thread on the opposite side of said lock collar from said windage sleeve and windage sleeve lock nut, a set screw on said lock collar for lockably engaging said telescope tube, and horizontally and vertically extending ramps fixedly carried by said adjusting mount and against which the windage and elevation sleeves bear respectively to cam the telescope tube into adjusted windage and elevation positions when the corresponding sleeves are screwed along said telescope tube.

4. A telescope sight in accordance with claim 3, wherein said telescope tube has longitudinally disposed windage and elevation scales adjacent the windage and elevation sleeves, respectively.

5. A telescope sight comprising a holding mount and an adjusting mount, each mount having a stationary part adapted for rigid connection to spaced points along a firearm, a telescope tube swivally connected to said holding mount, said adjusting mount comprising a member connected to the stationary part of said adjusting mount for vertical and horizontal movement relative thereto, said adjusting mount further comprising cam engaging means longitudinally adjustable on said tube and respective fixed cooperating cam elements on the stationary part of said adjusting mount, whereby longitudinal adjustment of a respective cam engaging means deflects said telescope horizontally and vertically.

6. A telescope sight comprising a telescope tube, a holding mount supporting said telescope tube for deflection in horizontal and vertical planes, an adjusting mount, said adjusting mount comprising a first member embracing said telescope tube, means connecting said first member to said telescope tube and permitting longitudinal adjustment of said first member along said telescope tube, a second member carried by said first member, said second member being adjustable to engage said telescope tube to lock said first member in adjusted position along said telescope tube, first and second sleeves threaded on said telescope tube, and cam portions fixed on said adjusting mount with which said sleeves are respectively engageable when moved along said telescope tube for deflecting said telescope tube for windage and elevation compensations respectively.

7. A telescope sight comprising a telescope tube, a holding mount supportably holding said telescope tube for deflection in horizontal and vertical planes, an adjusting mount comprising a stationary member and a movable member, said movable member being secured to the telescope tube, fixed lateral and vertical cams on said stationary member, windage and elevation cam engaging means carried by said telescope tube for movement therealong, said windage and elevation cam engaging means being respectively movable in engagement with said lateral and vertical cams to deflect said telescope tube for windage and elevation compensations, respectively, and means for locking said movable member and said stationary member together in adjusted relation.

8. A telescope sight comprising a telescope tube, a holding mount supportably holding said telescope tube for vertical and horizontal deflection, an adjusting mount, said adjusting mount comprising a relatively stationary member, a member movable relative to said stationary member, and means connected between said stationary member and said movable member for locking them in adjusted relation, means connecting said movable member to said telescope tube, windage and elevation cam engaging means mounted for movement substantially parallel to the axis of said telescope tube, fixed lateral and vertical cams on said stationary member with which the windage and elevation cam engaging means are respectively engageable to deflect said telescope tube for windage and elevation compensations, respectively.

9. A telescope sight according to claim 3 wherein said adjusting mount further comprises a relatively stationary base and a part on said lock collar engageable with different portions of a part of said base in accordance with the windage and elevation deflections of said telescope tube, and locking means interengaged with said part of the lock collar and said part of the base for locking said lock collar in adjusted position relative to said base.

OSCAR CLEVELAND GIBBS.